United States Patent

[11] 3,582,143

[72] Inventor Haralambo G. Dimopoulos
 Houston, Tex.
[21] Appl. No. 823,415
[22] Filed May 9, 1969
[45] Patented June 1, 1971
[73] Assignee Shell Oil Company
 New York, N.Y.

[54] SLUMP TANK ARRANGEMENT FOR PREVENTING PLUG FORMATION IN A SHUTDOWN SLURRY PIPELINE
 4 Claims, 2 Drawing Figs.
[52] U.S. Cl. ................................................. 302/14,
 302/64, 302/66
[51] Int. Cl. ................................................. B65g 53/30
[50] Field of Search ........................................... 302/14, 15,
 16, 66, 64

[56] References Cited
UNITED STATES PATENTS
2,631,899 3/1953 Jullien .................. 302/14

Primary Examiner—Andres H. Nielsen
Attorneys—Thomas R. Lampe and J. H. McCarthy

ABSTRACT: Method and apparatus for preventing plug formation in a shutdown slurry pipeline. Drain pipes incorporating automatic valves are placed along low points of the pipeline and in operative association with slump tanks adapted to receive slurry material upon pipeline shutdown. Means is provided whereby slurry in the line may be recirculated back into the pipeline at another location.

PATENTED JUN 1 1971

3,582,143

INVENTOR:
H. G. DIMOPOULOS
BY: *Thomas R. Lange*
HIS ATTORNEY

SLUMP TANK ARRANGEMENT FOR PREVENTING PLUG FORMATION IN A SHUT-DOWN SLURRY PIPELINE

The present invention relates to pipeline transport operations; and, more particularly, to a method and apparatus for preventing plug formation caused by the downward movement of slurry solids in an inclined portion of pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclines to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties are most commonly avoided by laying solids-carrying or slurry pipelines so that they do not exceed a slope or angle of inclination below which sliding does not occur. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby slurry solid phase material being transported in an inclined pipeline section is prevented from compacting and forming a plug during a line shutdown.

This and other objects have been attained in the present invention by providing a method and apparatus for preventing plug formation in a shutdown slurry pipeline wherein drain pipes incorporating automatic valves are located at predetermined intervals along the pipeline, said valves being set to open automatically when the pipeline flow rate falls below some predetermined minimum value. The drain pipes lead to slump tanks for temporarily storing slurry drained from the pipeline upon shutdown. Agitation means in the slump tanks additionally assist in maintaining the slurry in a substantially homogeneous condition until pipeline restart.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

Figure 1:
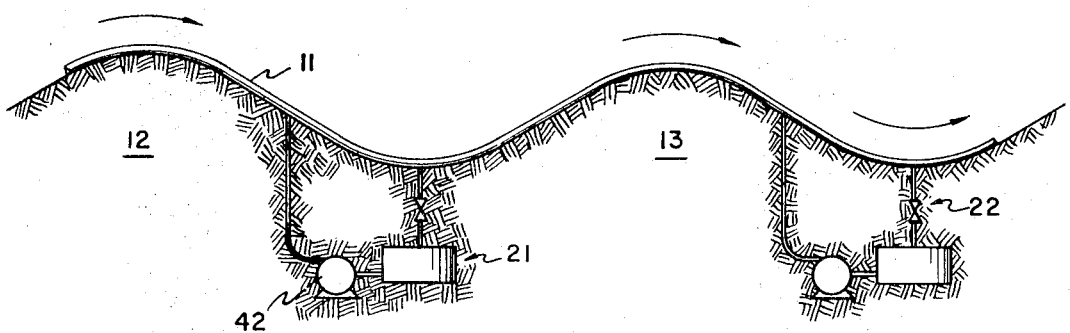
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such setting out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend. In the illustrated pipeline configuration, such solids would slide downwardly into the valley formed between hills or mountains 12 and 13. The solid material would then compress under its own weight to form a plug in the valley in an obvious manner.

Figure 2:
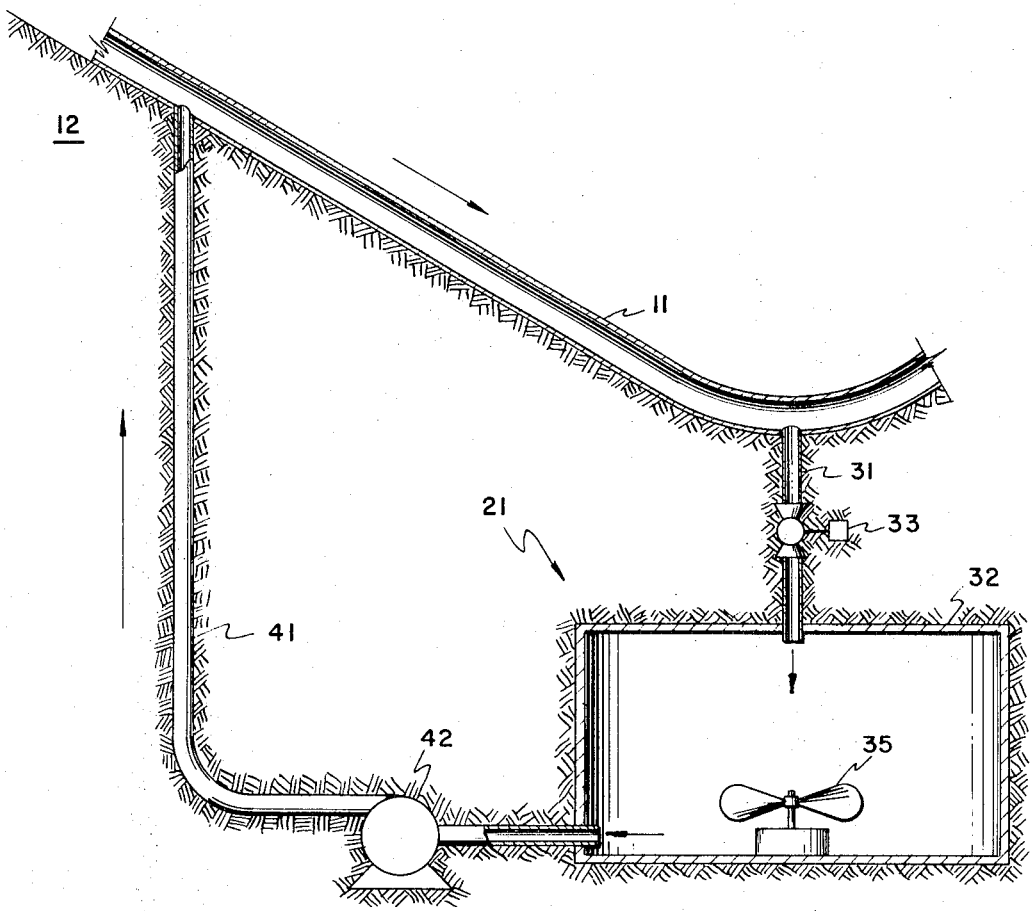
FIG. 2 is an enlarged cross-sectional view in longitudinal projection illustrating an inclined portion of the pipeline section of FIG. 1 with a slump tank arrangement in operative association therewith in accordance with the teachings of the present invention.

Slump tank arrangements for preventing plug formation in accordance with the teachings of the present invention are indicated generally in FIG. 1 by means of reference numerals 21 and 22. It should be noted that such arrangements are disposed adjacent to low points in the pipeline where plug formation caused by slumping and compacting of slurry solid phase material under the influence of gravity is likely to occur. Since the operations of the various slump tank arrangements disposed along the pipeline are identical, the operation of only one such slump tank arrangement, i.e., arrangement 21, will be discussed with particular reference to FIG. 2.

Referring to that figure, it may be seen that a drain pipe or conduit 31 is attached to a low point in pipeline 11 and extends downwardly therefrom. Conduit 31 defines a throughbore in communication with the interior of pipeline 11 and is secured to the pipeline by any known manner, as by threaded engagements or welding. The conduit 31 is secured at the other end thereof to a slump tank 32 positioned under pipeline 11. A valve 33 is disposed in conduit 31 to control flow therein. Valve 33, which may be of any known conventional type, is closed during slurry transport and responsive to the drop in the slurry flow rate below a predetermined value (through operative association with a conventional automatic mechanism) to open. When valve 33 opens, slurry flows under the influence of gravity downwardly through conduit 31 into the interior of tank 32. Valve 33 should be positioned very close to the pipeline 11 since otherwise conduit 31 will plug while the pipeline is under normal operation. An agitation mechanism 35 of any suitable type is disposed within tank 32 to maintain the slurry material within the tank in a substantially homogeneous condition. In this manner the slurry solid phase material does not have an opportunity to accumulate and compact in the low points of pipeline 11.

A pipe 41 extends from the bottom of tank 32 and leads to a higher elevation of pipeline 11, i.e., to a point along the pipeline lying uphill. A pump 42 is disposed in pipe 41 to pump slurry material from tank 32 to the uphill pipeline location. If desired, pump 42 may be actuated at the same time valve 33 is opened, thereby continuously recirculating slurry material as shown by the arrows in FIG. 2. Alternatively, it may be found desirable to simply allow the slurry material to accumulate within tank 32 until pipeline restart, whereupon valve 33 is closed and pump 42 is actuated to empty the contents of the tank 32 into pipeline 11. Through the use of either approach, plug formation is prevented since the slurry solid phase material never has an opportunity to settle out and compact in the pipeline. It should be understood that a pump may be disposed in drain pipe 31 to pump slurry material into tank 32. In the event this expedient is utilized, tank 32 need not be disposed under pipeline 11 since gravity is not needed to assist in the pipeline-draining operation.

I claim:

1. Apparatus for preventing plug formation in a shutdown pipeline used to transport slurry material comprising a solid phase and a liquid phase, said apparatus comprising:

slurry drain means for draining slurry from said pipeline disposed in operative associated with the pipeline at those locations where plug formation is likely to occur in the pipeline upon pipeline shutdown due to the slumping and compacting of slurry solid phase material under the influence of gravity;

slurry storage means for temporarily storing the slurry drained from said pipeline in communication with said means for draining said pipeline;

valve means in operative association with said means for draining said pipeline for selectively controlling flow of slurry from said pipeline into said means for temporarily storing the slurry; and slurry recirculation means for recirculating said slurry from said slurry storage means directly back into a portion of said pipeline where plug formation due to the slumping and compacting of slurry solid phase material under the influence of gravity is unlikely to occur upon pipeline shutdown.

2. The apparatus of claim 1 further including means disposed in said means for temporarily storing the slurry for maintaining the slurry in a substantially homogeneous condition.

3. The apparatus of claim 1 wherein said means for recirculating the slurry comprises conduit means extending from said means for temporarily storing the slurry to said pipeline and pump means disposed in operative association with said conduit means.

4. A method of preventing plug formation in a shutdown pipeline used to transport slurry material comprising a solid phase and a liquid phase, said method comprising the steps of:

draining slurry material from said pipeline after slurry flow falls below a predetermined rate at a location along said line where plug formation caused by slumping and compacting of slurry solid phase material under the influence of gravity is likely to occur upon pipeline shutdown;

storing said drained slurry material until pipeline restart;

agitating said stored slurry material; and recirculating said slurry directly back into a portion of said pipeline where plug formation caused by slumping and compacting of slurry solid phase material under the influence of gravity is unlikely to occur upon pipeline shutdown.